US012700535B2

(12) United States Patent
Cen et al.

(10) Patent No.: US 12,700,535 B2
(45) Date of Patent: Aug. 4, 2026

(54) REACTOR

(71) Applicant: ABB E-mobility B.V., Delft (NL)

(72) Inventors: Yijie Cen, Shenzhen (CN); Bing Huang, Shenzhen (CN); ZhiYong Lv, Shenzhen (CN)

(73) Assignee: ABB E-Mobility B.V., Delft (NL)

(*) Notice: Subject to any disclaimer, the term of this patent is extended or adjusted under 35 U.S.C. 154(b) by 788 days.

(21) Appl. No.: 18/166,554

(22) Filed: Feb. 9, 2023

(65) Prior Publication Data

US 2023/0253145 A1 Aug. 10, 2023

(30) Foreign Application Priority Data

Feb. 9, 2022 (CN) ......................... 202210121708.7

(51) Int. Cl.

*H01F 27/30* (2006.01)
*H01F 27/28* (2006.01)
*H01F 27/32* (2006.01)

(52) U.S. Cl.

CPC ....... *H01F 27/306* (2013.01); *H01F 27/2823* (2013.01); *H01F 27/2876* (2013.01); *H01F 27/324* (2013.01)

(58) Field of Classification Search

CPC ..................................................... H01F 27/206
USPC ......................... 336/192, 198–199, 206–208
See application file for complete search history.

(56) References Cited

U.S. PATENT DOCUMENTS

| | | | | |
|---|---|---|---|---|
| 6,771,157 B2 * | 8/2004 | Nishikawa | H01F 17/062 336/212 |
| 7,474,187 B1 * | 1/2009 | Huang | H01F 41/098 336/65 |
| 9,183,974 B1 * | 11/2015 | Folker | H01F 27/306 |
| 9,401,237 B1 * | 7/2016 | Folker | H01F 27/325 |
| 9,905,352 B2 | 2/2018 | Cedell et al. | |
| 2004/0095221 A1 | 5/2004 | Sigl | |
| 2016/0133379 A1 * | 5/2016 | Lin | H01F 27/30 336/198 |
| 2016/0307684 A1 | 10/2016 | Takiguchi et al. | |
| 2021/0012943 A1 | 1/2021 | Ebner et al. | |

FOREIGN PATENT DOCUMENTS

| | | |
|---|---|---|
| EP | 3018665 A1 | 5/2016 |
| JP | 2020-47721 A | 3/2020 |
| WO | WO 02/41337 A1 | 5/2002 |
| WO | WO 2015/047429 A1 | 4/2015 |
| WO | WO 2017/197368 A1 | 11/2017 |

OTHER PUBLICATIONS

European Patent Office, Extended European Search Report in European Patent Application No. 23155896.6, 7 pp. (Jul. 11, 2023).

* cited by examiner

*Primary Examiner* — Ronald Hinson
(74) *Attorney, Agent, or Firm* — McCarter & English, LLP

(57) ABSTRACT

A reactor, comprising: a support; a coil wound on an outer surface of the support and including a plurality of coil segments electrically connected in sequence; and at least one first insulating separator disposed on the outer surface of the support and separating the outer surface of the support into a plurality of regions, in which the plurality of coil segments is respectively arranged.

7 Claims, 7 Drawing Sheets

REACTOR

FIELD

The present disclosure relates to electronic devices and, more particularly, to a reactor.

BACKGROUND

In the design of power electronic circuits, a large number of various types of power electronic devices need to be used, such as power switching devices, capacitors, reactors. Among them, the reactor has many functions such as filtering and current limiting, and is an important device in the circuit.

With the development of technology, reactors in power electronic circuits are required to have higher power density and higher efficiency. Generally, in order to realize this requirement, the switching frequency in the circuits is increased, switching devices such as silicon carbide components are used, and high-frequency magnetic materials can be used in the reactors, for example. However, with increasing frequency, in some situations such as high frequency and high voltage, the reliability and operation performance of the reactor may be adversely affected.

SUMMARY

In order to at least partially solve the above and other possible problems, embodiments of the present disclosure provide an improved reactor.

According to an aspect of the present disclosure, there is provided a reactor, the reactor comprising: a support; a coil wound on an outer surface of the support and including a plurality of coil segments electrically connected in sequence; and at least one first insulating separator disposed on the outer surface of the support and separating the outer surface of the support into a plurality of regions in which the plurality of coil segments is respectively arranged.

In some embodiments of the present disclosure, the plurality of coil segments is sequentially arranged in the plurality of regions in a direction from a winding start point of the coil to a winding end point of the coil.

In some embodiments of the present disclosure, the coil is wound on the outer surface of the support in a single layer.

In some embodiments of the present disclosure, the reactor further comprises a magnetic core that is at least partially disposed in a hollow inner cavity of the support.

In some embodiments of the present disclosure, the reactor further comprises cooling air ducts arranged between the cavity wall of the hollow inner cavity of the support and the magnetic core.

In some embodiments of the present disclosure, the cooling air ducts are located on both sides of the magnetic core.

In some embodiments of the present disclosure, the reactor further comprises positioning bodies disposed on the cavity wall of the hollow inner cavity of the support, and the positioning bodies contact against the magnetic core to fix the magnetic core in the hollow inner cavity of the support.

In some embodiments of the present disclosure, the positioning bodies are configured such that a gap between the magnetic core and the coil is larger than air gaps in a main magnetic circuit of the magnetic core.

In some embodiments of the present disclosure, the reactor further comprises at least one second insulating separator disposed at an end portion of the support to separate the coil from the magnetic core at the end.

In some embodiments of the present disclosure, the at least one first insulating separator and the at least one second insulating separator comprise insulating fins.

The summary is provided to introduce a selection of concepts in a simplified form that will be further described in the following detailed description of embodiments. It should be appreciated that this Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other features, advantages and aspects of various embodiments of the present disclosure will become more apparent. Throughout the drawings, the same reference symbols generally refer to the same elements, wherein.

DETAILED DESCRIPTION OF EMBODIMENTS

Figure 1:
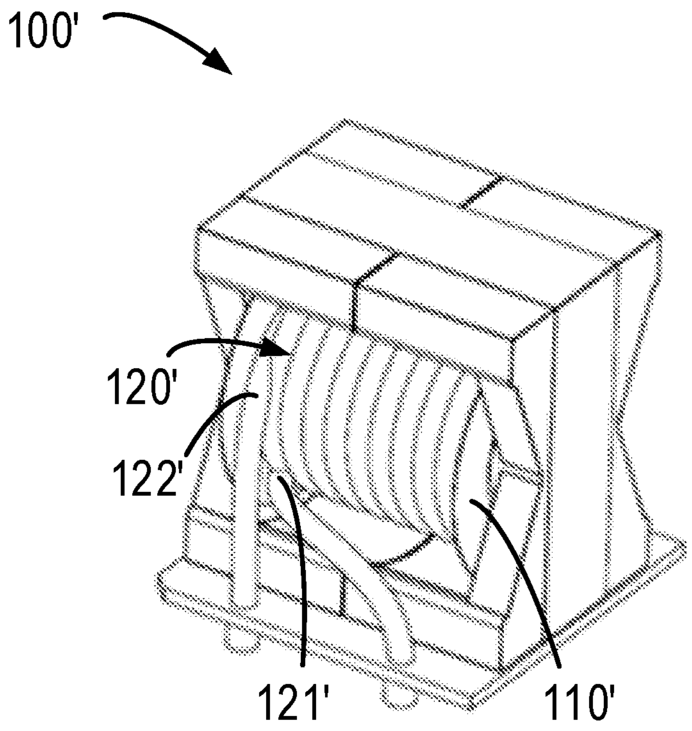
FIG. 1 shows a perspective view of a conventional reactor.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art. Those skilled in the art may obtain alternative technical solutions from the following description without departing from the spirit and scope of the disclosure.

As used herein, the term “comprises” and its variants are to be read as open-ended terms that mean “comprises, but is not limited to.” The term “or” is to be read as “and/or” unless the context clearly indicates otherwise. The term “based on” is to be read as “based at least in part on.” The term “one example embodiment” and “an example embodiment” are to be read as “at least one example embodiment.” The following text may also contain other explicit or implicit definitions.

FIG. 1 shows a perspective view of a conventional reactor 100'. As shown in FIG. 1, in a conventional reactor 100', a coil 120' is wound on a support 110'. In the process in which the coil 120' is wound on the support 110', the coil 120' is wound at a start point 121' from one end of the support 110' to the other end to form a first layer of turns. After the coil 120' reaches the other end of the support 110', the coil 120' changes the winding direction and continues winding toward the end where the start point 121' is located, thereby forming a second layer of turns overlapping the first layer of turns. After the coil 120' returns to the end where the start point 121' is located, the coil 120' ends winding at an end point 122' and leaves the support 110'. Alternatively, after forming the second layer of turns, the coil 120' may continue to be wound, and thus more layers of turns may be wound on the support 110' in a similar manner.

It can be seen that in such a reactor 100', high-potential turns and low-potential turns are arranged overlapping or adjacent to each other, which may cause some problems during the operation of the reactor 100'. For example, there may be a very high electric field strength or potential difference between the high-potential turns and the low-potential turns. By way of example only, the voltage between the turns at the start point 121' and the turns at the end point 122' may be as high as 1800V in resonant reactors of some topologies such as LLC topology. Especially when the reactor 100' is operated at a high frequency (e.g., 100 kHz to 250 kHz), this electric field, which is constantly varying at high frequency, may damage or destroy the insulating performance of the insulating material, thus shortening the service life of the insulating material in the reactor 100'. The decrease in the reliability of the insulation material will further significantly affect the overall reliability and safety of the reactor 100'. In addition, this coil arrangement will also increase parasitic capacitance, which may cause current oscillation during on-off of the switching device, resulting in serious noise problems. Furthermore, the iron loss of the magnetic core in the reactor 100' is mainly dissipated through coils and insulating materials, so that the inside of the reactor 100', such as the center of the magnetic core, has high thermal resistance, which leads to the heat not being dissipated in time, thus degrading the performance of the reactor 100'.

Embodiments of the present disclosure provide an improved reactor. In the improved solution, the outer surface of the support of the reactor is separated into a plurality of regions by an insulating separator, and coil segments at different potentials are respectively placed in two or more of regions to be separated by the insulating separator. Therefore, it is possible to avoid the occurrence of excessive voltage or excessive electric field strength between adjacent turns, thereby alleviating and eliminating the influence of high frequency and high voltage on the insulation life of the reactor, and also effectively reducing the parasitic capacitance of the reactor.

Figure 2:
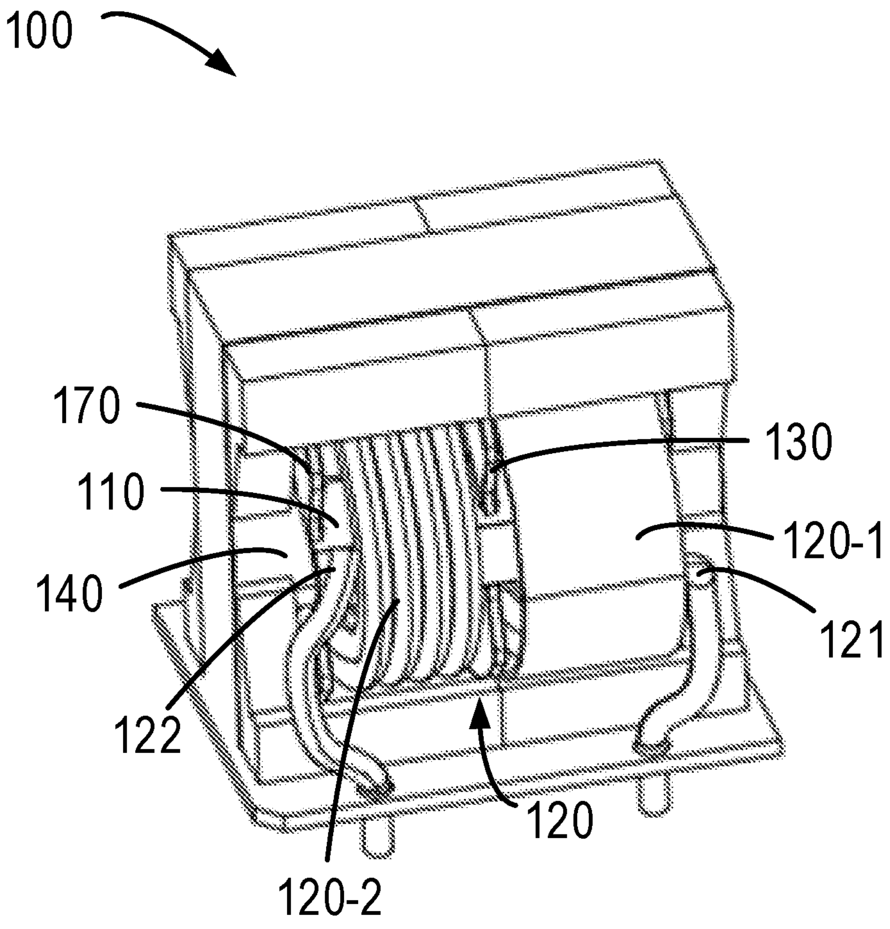
FIG. 2 shows a perspective view of a reactor according to an embodiment of the present disclosure.
Figure 3A:
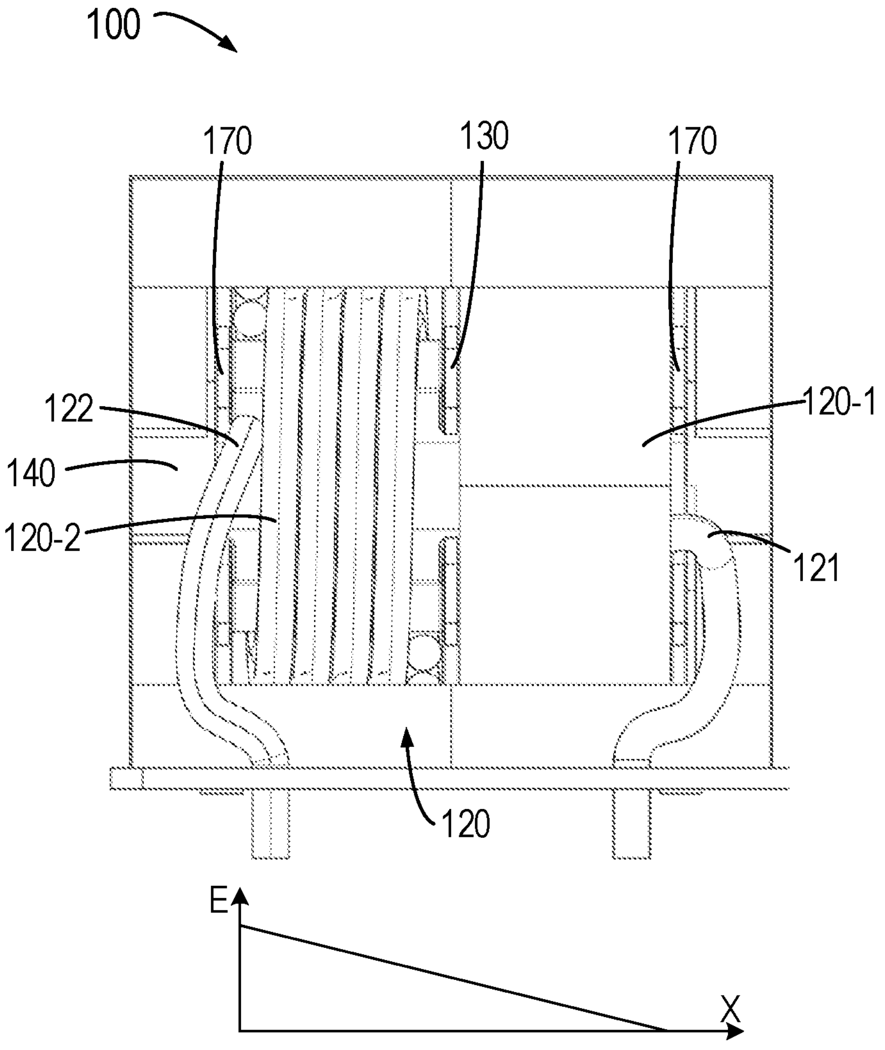
FIGS. 3A and 3B respectively show a front view and a side view of a reactor according to an embodiment of the present disclosure.
Figure 3B:
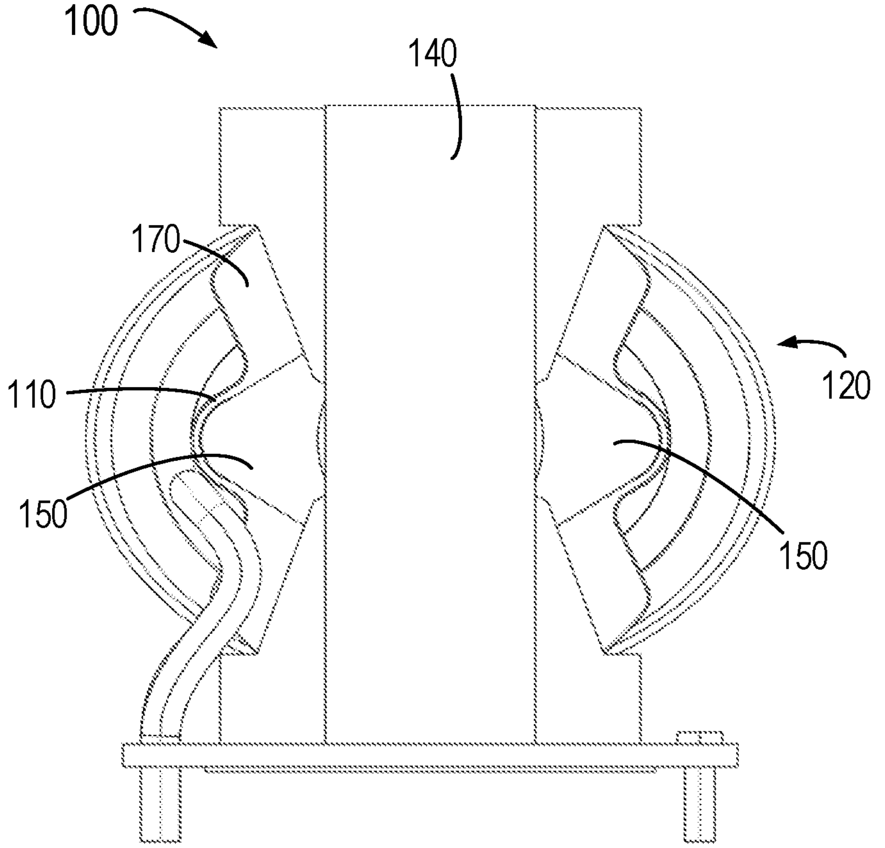

FIG. 2 shows a perspective view of a reactor 100 according to an embodiment of the present disclosure, and FIGS. 3A and 3B show a front view and a side view of the reactor 100 according to an embodiment of the present disclosure, respectively. As shown in FIGS. 2, 3A and 3B, the reactor 100 includes a support 110 and a coil 120 wound on an outer surface of the support 110 and including a plurality of coil segments 120-1, 120-2 electrically connected in sequence. As an example, the support 110 may be made of an insulating material and have some degree of strength. For example, the support 110 may be shaped like a cylinder to facilitate winding the coil 120 on the outer surface of the support 110. However, the support 110 may also be shaped into other suitable shapes. As an example, the coil 120 may be a wire having an insulating housing or an insulating outer layer, or other types of insulating conductors, and may include two coil segments 120-1, 120-2 electrically connected in sequence. The expression of "electrically connected in sequence" indicates that when the reactor 100 is in operation, the two coil segments 120-1, 120-2 have different potentials from each other, i.e., one coil segment as a whole is at a lower potential while the other coil segment as a whole is at a higher potential. However, it is appreciated that the coil 120 may also include more coil segments, for example, three, four or more. In the case where the coil 120 includes more than two coil segments, these coil segments are also electrically connected in sequence or one after another to form the coil 120, whereby each coil segment may have a different potential from the other coil segments when the reactor 100 is in operation.

Figure 4:
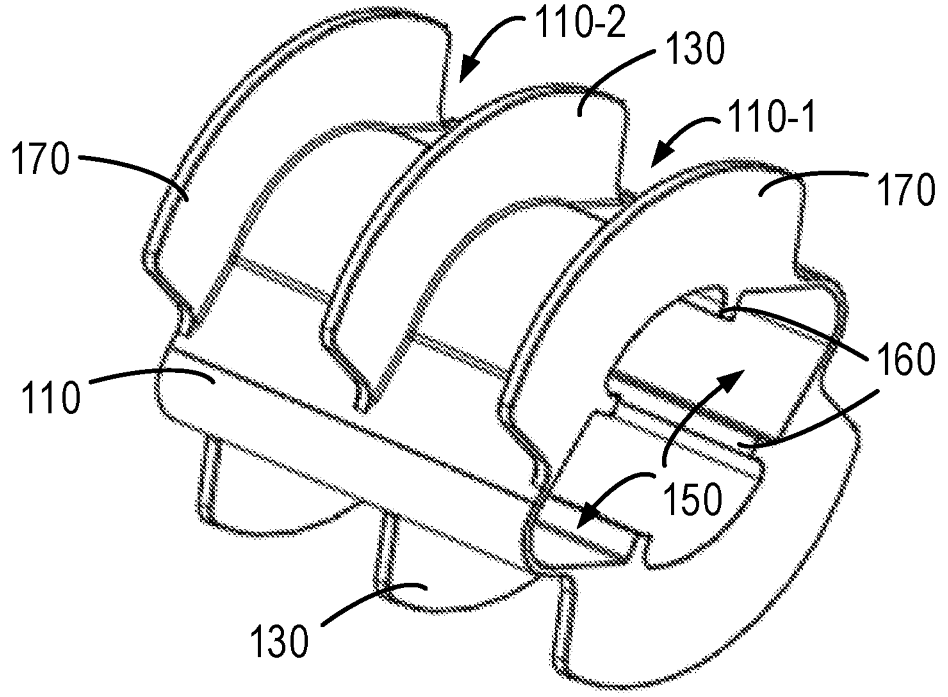
FIG. 4 shows a perspective view of a support of a reactor and related members disposed on the support according to an embodiment of the present disclosure.
Figure 5A:
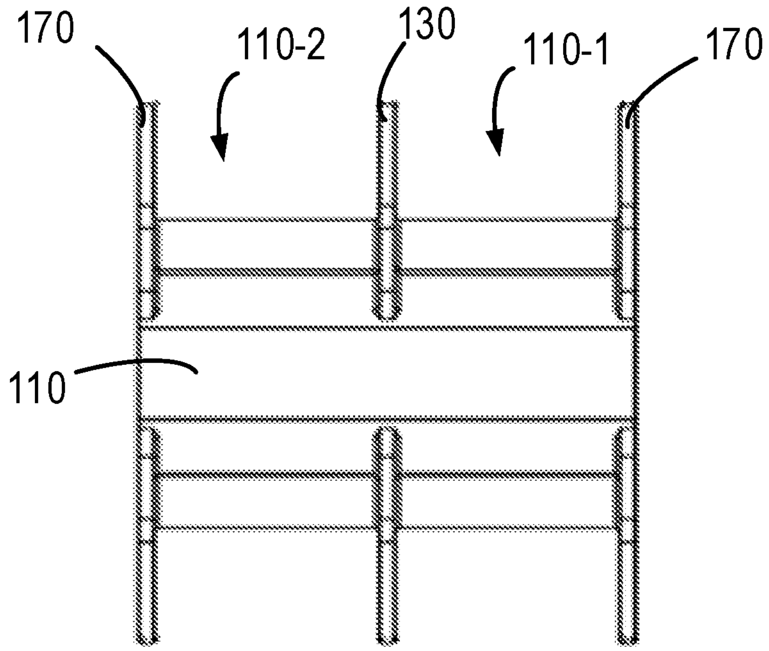
FIGS. 5A and 5B respectively show a front view and a side view of a support of a reactor and related members disposed on the support according to an embodiment of the present disclosure.
Figure 5B:
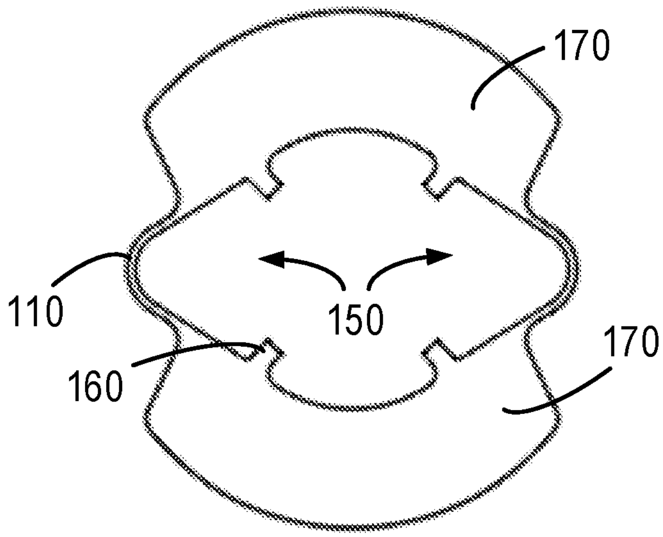

FIG. 4 shows a perspective view of a support 110 and related members disposed on the support 110 according to an embodiment of the present disclosure, and FIGS. 5A and 5B respectively show front and side views of the support 110 and related members disposed on the support 110 according to an embodiment of the present disclosure. According to an embodiment of the present disclosure, as shown in FIGS. 4, 5A, and 5B, the reactor 100 further includes at least one first insulating separator 130 disposed on the outer surface of the support 110 and separating the outer surface of the support 110 into a plurality of regions 110-1, 110-2, and a plurality of coil segments 120-1, 120-2 disposed in the plurality of regions 110-1, 110-2, respectively. As an example, the first insulating separator 130 may be disposed on the support 110 in a suitable manner, including but not limited to integral molding, fastener fixing, bonding, and the like. Thus, the first insulating separator 130 may separate the outer surface of the support 110 into regions 110-1 and 110-2, and the coil segment 120-1 may be wound in one of the regions 110-1 and 110-2, and the coil segment 120-2 may be wound in the other region. In this way, the two coil segments 120-1 and 120-2 having different potentials during operation of the reactor 100 can be respectively arranged in different regions, and the two coil segments 120-1 and 120-2 are also separated by the first insulating separator 130. Compared with the reactor 100', in which high and low potential turns are arranged adjacent to or overlapped with each other, the improved scheme can reduce the electric field between turns by up to 90%, which effectively avoids the damage of high voltage and high frequency to the insulation material of the reactor, and thus prolongs the service life of the insulation material of the reactor. In addition, this arrangement is also conducive to reducing parasitic capacitance, thus alleviating or eliminating noise problems that may be caused by high frequencies. It can be appreciated that the number of the first insulating separators 130 is not limited by the number shown in the figure, but more than one first insulating separator 130 can be arranged on the support 110, and thus more regions are correspondingly separated on the outer surface of the support 110 to accommodate more coil segments. In addition, the arrangement position of the first insulating separator 130 can also be other suitable positions, as long as adjacent coil segments can be effectively separated.

In some embodiments of the present disclosure, a plurality of coil segments 120-1, 120-2 are sequentially arranged in a plurality of regions 110-1, 110-2 in a direction from a winding start point 121 of the coil 120 to a winding end point 122 of the coil 120. As an example, the coil 120 may start winding on the support 110 at the winding start point 121 and end winding at the winding end point 122. The winding start point 121 and the winding end point 122 may be spaced apart from each other. For example, they may be located at both ends of the support 110, respectively. When the reactor 100 operates, the winding start point 121 and the winding end point 122 are positions having the highest potential and the lowest potential, respectively. Thus, the coil segments 120-1 and 120-2 of the coil 120 are sequentially arranged in the direction from the highest potential position to the lowest potential position, and the coil segments are separated by the first insulating separator 130. It is appreciated that the outer surface of the support 110 may be separated into more than two regions by a plurality of first insulating separators 130, and the coil 120 may comprise more than two coil segments. For example, in the case of four winding regions and four coil segments, the four winding regions may be sequentially arranged in the direction from the winding start point 121 and the winding end point 122, and the four coil segments may be sequentially arranged in the four regions from high to low, or from low to high, in terms of electrical potential. That is, a plurality of coil segments is sequentially arranged on the outer surface of the support 110 in such a manner that the potential gradually changes from high to low, or from low to high. In this way, it can be ensured that the coil segments with large potential difference between them are away from each other, while the coil segments adjacent to each other have relatively small potential differences and are also separated by the first insulating separator 130, whereby the electric field strength or potential difference between adjacent turns can be minimized, thereby protecting the insulating material from damage of high frequency and high voltage, and suppressing parasitic capacitance.

In some embodiments of the present disclosure, the coil 120 is wound on the outer surface of the support 110 in a single layer. As an example, the coil 120 may start winding at the winding start point 121 and reach the vicinity of the first insulating separator 130 to form a single-layer coil segment 120-1 at the winding region 110-1 between the winding start point 121 and the first insulating separator 130. The coil 120 may pass through the first insulating separator 130 into the winding region 110-2 on the other side of the first insulating separator 130 via the gap of the first insulating separator 130. After entering the winding region 110-2, the coil 120 continues winding until reaching the winding end point 122 to form a single-layer coil segment 120-2 in the winding region 110-2 between the first insulating separator 130 and the winding end point 122. In other words, the coil 120 is a single-layer coil starting at one end and ending at the other end, and the first insulating separator 130 may separate adjacent coil segments 120-1 and 120-2. It is appreciated that the coil 120 may also be wound with a plurality of layers in some or all of the winding regions 110-1 and 110-2. For example, the coil 120 may wind two or more layers of turns in the winding region 110-1 to form the coil segment 120-1, then pass through the first insulating separator 130 via the gap of the first insulating separator 130 into the winding region 110-2 on the other side, and wind two or more layers of turns in the winding region 110-2 to form the coil segment 120-2. In this case, although there are overlapping turns in each winding region, since coil segments with different overall potentials are still separated by one or more first insulation separators 130, the influence of high frequency and high voltage on the insulation material can still be reduced to some extent and parasitic capacitance can be reduced. However, compared with multi-layer turns, winding the coil 120 in a single layer is more advantageous because the potential of the coil 120 arranged in a single layer can be gradually increased or decreased from one end to the other end (as shown in the potential distribution diagram in FIG. 3A) to avoid the adjacent arrangement or overlapping arrangement of turns with large potential difference to the greatest extent, which is most beneficial to the protection of insulating materials and the reduction of parasitic capacitance.

Figure 6:
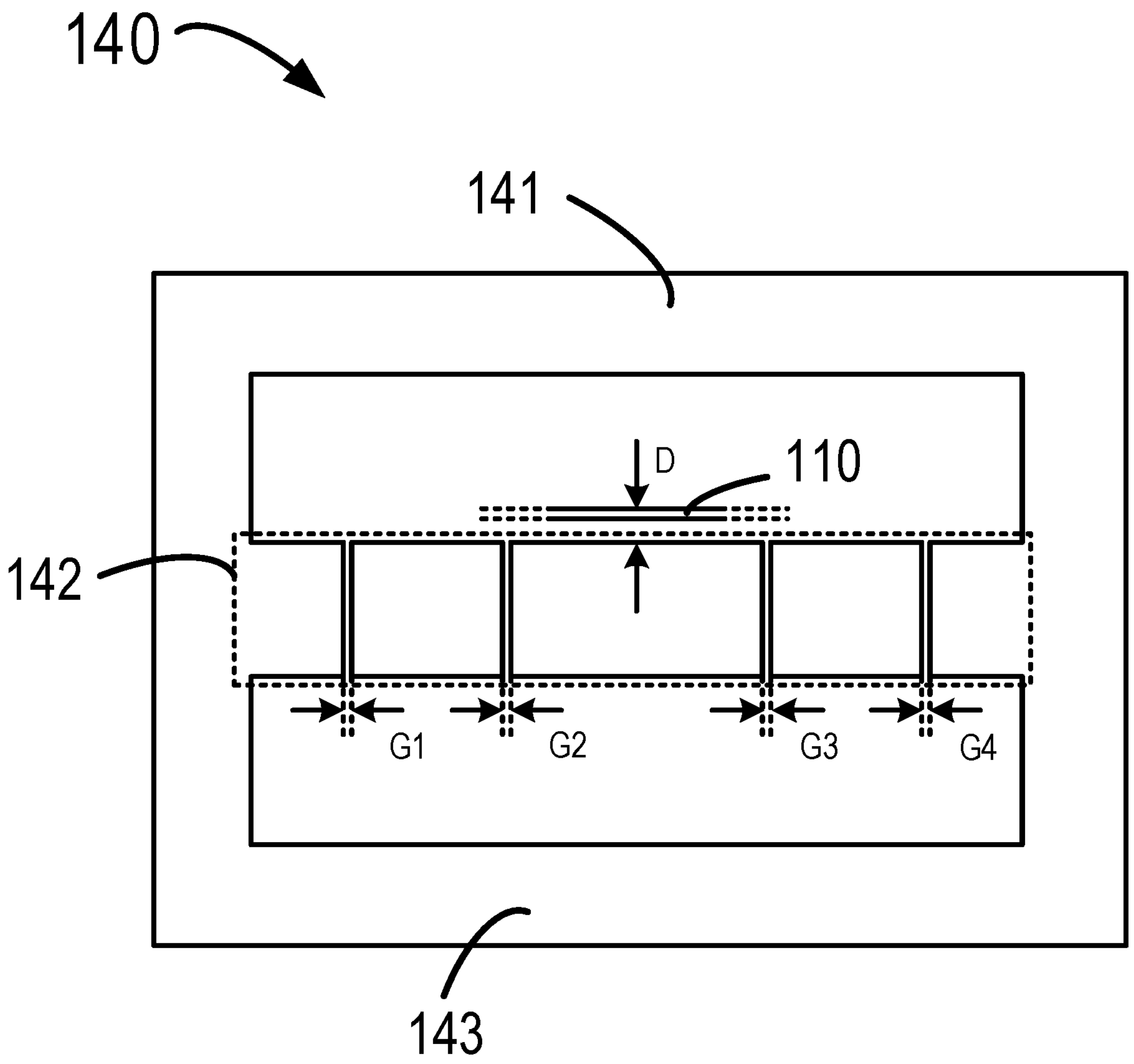
FIG. 6 shows a schematic diagram of a magnetic core of a reactor according to an embodiment of the present disclosure.

FIG. 6 shows a schematic diagram of a magnetic core 140 of a reactor 100 according to an embodiment of the present disclosure. In some embodiments of the present disclosure, the reactor 100 further includes a magnetic core 140 that is at least partially disposed in the hollow inner cavity of the support 110. As an example, the magnetic core 140 may include a plurality of legs 141, 142, 143, wherein, for example, the legs 142 may be disposed in a hollow inner cavity of the support 110. Thus, the coil 120 can induce magnetic flux in the leg 142, and the magnetic flux can flow in the main magnetic circuit formed by the legs 141, 142 and 143. The magnetic core 140 may be formed of a magnetically conductive material in an appropriate manner, for example, it may be formed by assembling two or more magnetically conductive portions. In addition, the leg 142 may also be composed of a plurality of core segments, e.g., five core segments, with air gaps G1, G2, G3, and G4 between the core segments.

In some embodiments of the present disclosure, as shown in FIG. 4, the reactor 100 further includes cooling air ducts 150 disposed between the cavity wall of the hollow inner cavity of the support 110 and the magnetic core 140. As an example, the cooling air ducts 150 help strengthen the heat dissipation of the magnetic core 140, especially the heat dissipation of the leg 142 disposed in the hollow inner cavity of the support 110, and reduce the thermal resistance of the magnetic core 140 and its leg 142. In contrast, in the conventional reactor 100', the heat caused by the iron loss of the core can only be dissipated through the coil and insulating material, which has higher thermal resistance, thereby leading to heat accumulation. For example, in the case of high frequency, the magnetic core of the conventional reactor 100' will generate appreciable heat, while high temperature is unfavorable to the performance and maintenance of the reactor, for example, it may lead to aging and damage of the insulation of the support and coil, and thus reduce the service life of the reactor. Therefore, by arranging the cooling air ducts 150 in the reactor 100, the iron loss heat of the magnetic core can be dissipated to the external environment in time, thus alleviating or eliminating high temperature heating during the operation of the reactor 100. For example, the operation temperature of the improved reactor 100 can be reduced from 140 degrees Celsius to 80 degrees Celsius compared to the reactor 100'.

In some embodiments of the present disclosure, cooling air ducts 150 are located on both sides of the magnetic core 140. As an example, the hollow inner cavity of the support 110 may be enlarged by expanding the support 110. Thus, after the leg 142 of the magnetic core 140 is disposed in the hollow inner cavity of the support 110, gaps can be left on both sides of the magnetic core 140 or the leg 142 to serve as the cooling air ducts 150. Since the cooling air ducts 150 are located at both sides of the magnetic core 140, the heat dissipation area of the magnetic core 140 can be increased. In addition, it is further advantageous that in this way, the portion of the magnetic core 140 extending outside the hollow inner cavity of the support 110 does not block the air flow between the cooling air ducts 150 and the ambient environment, which is advantageous for accelerating the exchange of hot and cold air.

In some embodiments of the present disclosure, the reactor 100 further includes one or more positioning bodies 160 disposed on the cavity wall of the hollow inner cavity of the support 110, and the one or more positioning bodies 160 contact against the magnetic core 140 to fix the magnetic core 140 in the hollow inner cavity of the support 110. As an example, the cavity wall of the hollow inner cavity of the support 110 may be provided with a plurality of positioning bodies 160, for example, four positioning bodies 160 arranged in a symmetrical manner. By contacting the magnetic core 140 (e.g., its leg 142) against the positioning bodies 160, the magnetic core 140 (e.g., its leg 142) can be stably mounted in the hollow inner cavity of the support 110 to define and maintain the relative position of the magnetic core 140 and the support 110, thus increasing the performance and consistency of products.

In some embodiments of the present disclosure, the positioning bodies 160 are configured such that the gap, D, between the magnetic core 140 and the coil 120 is larger than the air gaps in the main magnetic circuit of the magnetic core 140. As an example, the positioning bodies 160 may protrude from the cavity wall of the hollow inner cavity of the support 110 by a certain height. Thus, when the leg 142 of the magnetic core 140 contacts against the positioning bodies 160, the leg 142 will be separated from the cavity wall by a certain distance, which increases the gap D between the magnetic core 140 and the coil 120. The height of the positioning bodies 160 protruding from the cavity wall can ensure that the gap D between the magnetic core 140 and the coil 120 is larger than the air gaps in the main magnetic circuit of the magnetic core 140 (e.g., the sum of the air gaps G1, G2, G3, and G4 shown in FIG. 6). In this way, the area in which the edge magnetic flux intersects the coil or winding is reduced, and only the portion of the edge magnetic flux with low amplitude intersects the winding, thereby reducing undesired eddy current loss in the coil which may be generated by the edge magnetic flux.

In some embodiments of the present disclosure, the reactor 100 further includes at least one second insulating separator 170 disposed at ends of the support 110 to separate the coil 120 from the magnetic core 140 at the ends. As an example, one or more second insulating separators 170 may be provided at both ends of the support 110. Thus, the one or more second insulating separators 170 can separate the coil segments 120-1 and 120-2 in the winding regions 110-1 and 110-2 from portions of the magnetic core 140 outside the end of the support 110 to increase creepage distance and electrical clearance therebetween, and thus enhance insulation.

In some embodiments of the present disclosure, the at least one first insulating separator 130 and the at least one second insulating separator 170 include insulating fins. Specifically, at least a portion of the first insulating separator 130 and the second insulating separator 170 may be constructed in the form of insulating fins. The insulating fins can be conveniently mounted on the support 110, and due to the shapes of fins, coil segments in different winding regions are easily separated to the greatest extent.

Through the teaching given by the above depictions and related figures, many modifications and other embodiments of the present disclosure will be apparent to those skilled in the art. Therefore, it is to be appreciated that the embodiments of the present disclosure are not limited to the disclosed specific embodiments, and modifications and other embodiments are intended to be comprised within the scope of the present disclosure. In addition, while the above description and related figures have described example embodiments in the context of certain example combinations of components and/or functions, it should be appreciated that different combination forms of the components and/or functions may be provided by alternative embodiments without departing from the scope of the present disclosure. In this regard, for example, other combination forms of components and/or functions that are different from those explicitly described above are also contemplated as being within the scope of the present disclosure. Although specific terms are employed herein, they are used in a generic and illustrative sense and are not intended to be limiting.

What is claimed is:

1. A reactor, comprising:

a support having an outer surface and a hollow inner cavity, wherein a magnetic core is at least partially disposed in the hollow inner cavity of the support;

a coil wound on the outer surface of the support and including a plurality of coil segments electrically connected in sequence;

at least one first insulating separator disposed on the outer surface of the support and separating the outer surface of the support into a plurality of regions in which the plurality of coil segments are respectively arranged; and one or more positioning bodies disposed on a cavity wall of the hollow inner cavity of the support, wherein the one or more positioning bodies contact against the magnetic core to fix a position of the magnetic core within the hollow inner cavity of the support, wherein the one or more positioning bodies are configured such that a gap between the magnetic core and the coil is defined and is larger than air gaps in a main magnetic circuit of the magnetic core.

2. The reactor according to claim 1, wherein the plurality of coil segments is sequentially arranged in the plurality of regions in a direction from a winding start point of the coil to a winding end point of the coil.

3. The reactor according to claim 1, wherein the coil is wound on the outer surface of the support in a single layer.

4. The reactor according to claim 1, further comprising:

cooling air ducts arranged between the cavity wall of the hollow inner cavity of the support and the magnetic core.

5. The reactor according to claim 4, wherein the magnetic core has two sides, and wherein the cooling air ducts are located on both sides of the magnetic core.

6. The reactor according to claim 1, further comprising:

at least one second insulating separator disposed at an end of the support to separate the coil from the magnetic core.

7. The reactor according to claim 6, wherein the at least one first insulating separator and the at least one second insulating separator comprise insulating fins.

* * * * *